A. R. JENKINS.
PIPE COUPLING.
APPLICATION FILED JUNE 5, 1915.
1,156,145. Patented Oct. 12, 1915.
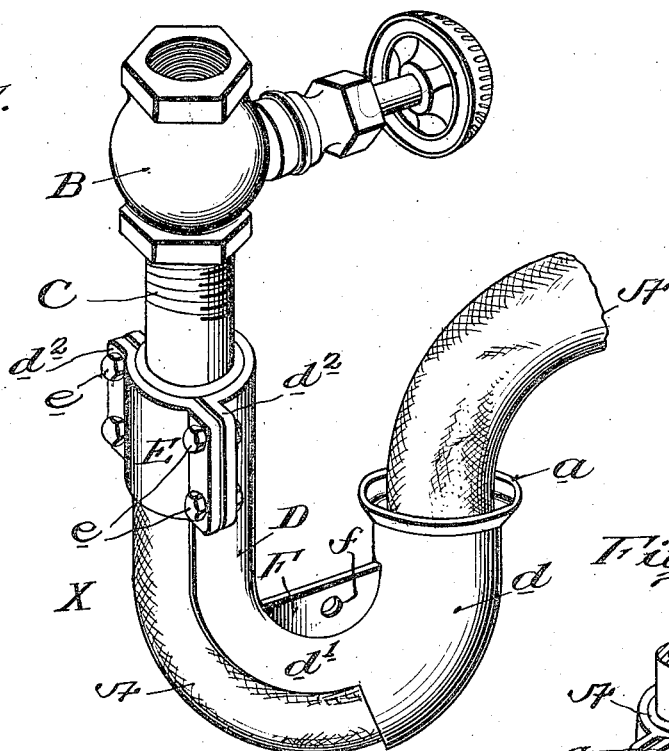
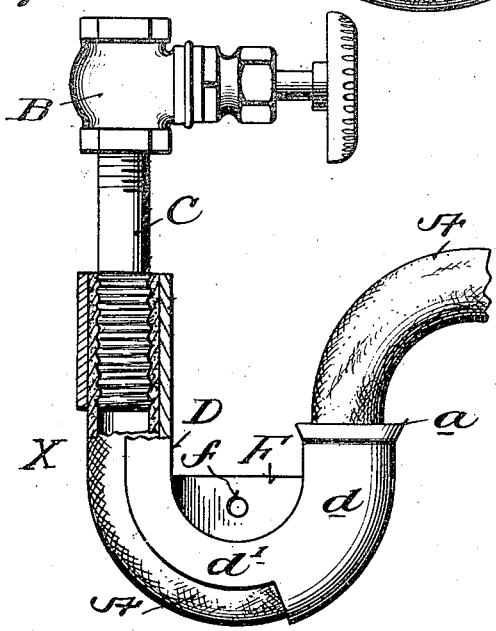
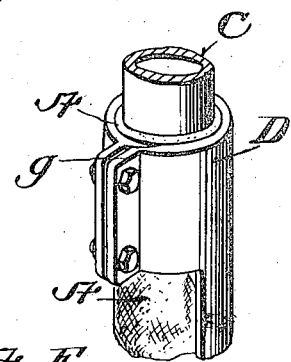
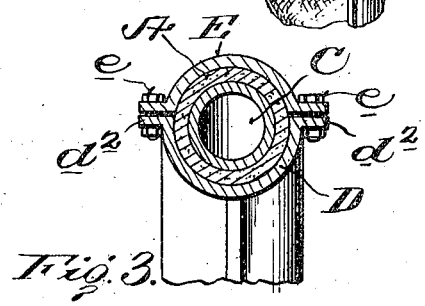
Inventor
Allen R. Jenkins,
by his Attorneys
Baldwin & Wight

UNITED STATES PATENT OFFICE.

ALLEN R. JENKINS, OF DURANT, MISSISSIPPI.

PIPE-COUPLING.

1,156,145.  Specification of Letters Patent.  Patented Oct. 12, 1915.

Application filed June 5, 1915. Serial No. 32,420.

*To all whom it may concern:*

Be it known that I, ALLEN R. JENKINS, a citizen of the United States, residing in Durant, in the county of Holmes and State of Mississippi, have invented certain new and useful Improvements in Pipe-Couplings, of which the following is a specification.

This invention relates to pipe couplings and the primary object of the invention is to provide an improved coupling for the flexible hose leading from a hot water injector to a pipe leading to a steam boiler, such as a locomotive boiler. In such couplings the connection between the hose and the pipe is usually such that a sharp bend is sometimes made in the hose which when often repeated causes the hose to crack, leak and often burst, and sometimes the hose separates from the pipe and its free end discharges hot water in various directions which is, of course, dangerous.

According to my invention I provide a coupling which protects that portion of the hose near the pipe to which it is connected and holds the hose in a curved position which prevents it from cracking or bursting and the coupling is so formed that should the hose separate from the pipe to which it is connected its free end instead of moving back through the coupling and separating therefrom will move laterally through an opening in the coupling while supported thereby. Thus the discharge of water from the free end of the hose is limited to a restricted area.

In the accompanying drawings, Figure 1 is a perspective view of a coupling for connecting a hose with a pipe embodying my improvements. Fig. 2 is a side elevation partly in section thereof. Fig. 3 shows a transverse section through the upper portion of the coupling. Fig. 4 is a perspective view of a modification.

The hose A leads from a hot water supply and is connected with a valve B by a short pipe C.

The valve B connects with a pipe leading to a boiler.

D indicates a part of the coupling which I call a hose-support, its function being to hold the hose in a curved condition and to thus prevent it from cracking or bursting and to also support the hose should the latter become separated from the pipe C. The hose-support may be made in various ways. In Fig. 1 it is shown as being composed of a curved tubular portion $d$ having a flared outer end $a$ to receive the hose and a curved portion $d'$ which is semi-cylindrical and adapted to cover only a part of the hose, *i. e.* that portion inside the bend. This semi-cylindrical portion extends to the coupling pipe C and, as indicated in Fig. 1, it is formed with lugs $d^2$ on opposite sides to receive a cap E which is held in place by bolts $e$. A web F is formed on the hose-support inside the bend and is perforated at $f$ to receive a bolt by means of which the hose-support may be attached to the engine. The hose is passed into the flared end of the support and drawn through the upper end thereof, it is then applied to the pipe C and afterward drawn back into the support in the manner shown. The cap is then applied and the bolts tightened to secure the parts in place. When in this condition there is little danger of the hose separating from the pipe. That portion of the hose near the valve is protected by a shield or sheath from coming in contact with tools and other such implements, and the hose is prevented from making sharp bends which would tend to break or crack it. The web F not only serves as a means for attaching the support to the frame of the engine, but also strengthens the bend of the support. If by any accident the end of the hose becomes separated from the pipe C it will not pass out through the portion $d$ as it would if the support was tubular from end to end but will only pass part way through the support and will move laterally out through the open portion thereof at the part marked X in Figs. 1 and 2. This is an important feature of the invention. When the hose is held in this condition it can discharge over a limited area only being at that time supported in a fixed position, whereas if the hose became entirely separated from the support it would discharge in various directions.

Instead of forming the support with lugs $d^2$, as indicated in Fig. 1, the upper portion of the support may be made cylindrical and split as indicated at $g$ in Fig. 4, and provided with lugs or flanges $g'$ bolted together as shown.

I claim as my invention:

1. A hose-support adapted to be applied to the coupling between a pipe and a hose having at one end a rigid, curved, cylindrical portion through which the hose extends and at its opposite end means for clamping it to the end of the hose which engages the pipe and being provided intermediate its opposite ends with an opening through which the free end of the hose may pass laterally when disengaged from the pipe.

2. The combination with a pipe, a hose attached thereto, a curved support having an outer portion through which the hose extends and which is connected by a stiffening web to an inner portion clamped to that end of the hose which is attached to the pipe and having also an opening between its opposite ends through which the hose may pass laterally when disengaged from the pipe.

In testimony whereof, I have hereunto subscribed my name.

ALLEN R. JENKINS.

Witnesses:
 WM. BLANKENSHIP.
 W. W. MAYFIELD.